United States Patent [19]

Erb

[11] 4,028,944

[45] June 14, 1977

[54] DEVICE FOR RECORDING TEMPERATURE MINIMUMS

[75] Inventor: Robert Allan Erb, Valley Forge, Pa.

[73] Assignee: The Franklin Institute, Philadelphia, Pa.

[22] Filed: Oct. 31, 1975

[21] Appl. No.: 627,697

[52] U.S. Cl. .................................. 73/356; 73/358; 116/114.5; 252/408

[51] Int. Cl.² ................. G01K 11/16; G01K 11/18; C09K 3/00

[58] Field of Search ......... 73/356, 358; 116/114 V, 116/114.5; 424/7; 426/88; 252/408

[56] References Cited

UNITED STATES PATENTS

| | | | |
|---|---|---|---|
| 2,850,393 | 9/1958 | Romito | 116/114.5 |
| 2,971,852 | 2/1961 | Schulein | 116/114.5 |
| 3,145,145 | 8/1964 | Reznek et al. | 424/7 |
| 3,194,669 | 7/1965 | Koch | 73/358 X |
| 3,615,719 | 10/1971 | Michel et al. | 73/358 X |
| 3,695,903 | 10/1972 | Telkes et al. | 116/114.5 |
| 3,696,679 | 10/1972 | Peterson et al. | 73/358 |
| R25,499 | 12/1963 | Fenity et al. | 116/114.5 |

*Primary Examiner*—Richard C. Queisser
*Assistant Examiner*—John S. Appleman
*Attorney, Agent, or Firm*—Weiser, Stapler & Spivak

[57] ABSTRACT

A device for recording a drop in temperature below a pre-selected temperature minimum. The device provides a permanent record of the drop in temperature. The device is reuseable.

58 Claims, 8 Drawing Figures

U.S. Patent   June 14, 1977   Sheet 1 of 2   4,028,944
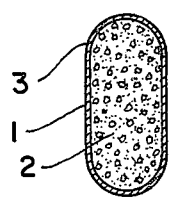
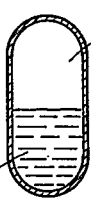
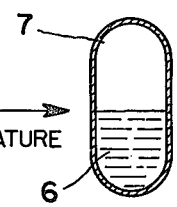
FIG. 1   COOLING BELOW TRANSITION TEMPERATURE → FIG. 2   WARMING ABOVE TRANSITION TEMPERATURE → FIG. 3
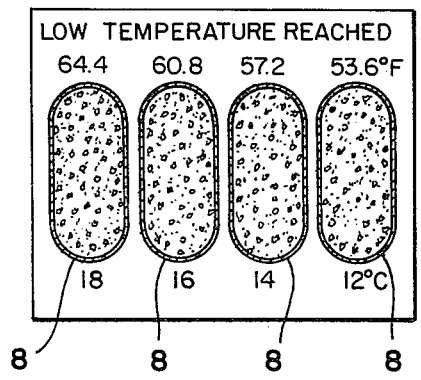
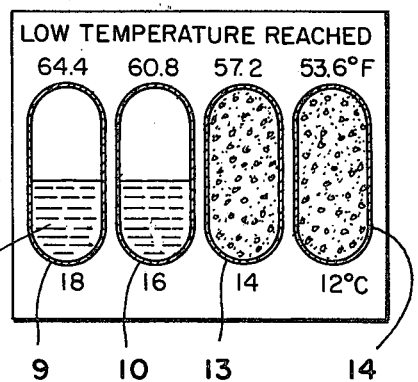
EXCURSION FROM 20°C (68°F) TO 15°C (59°F) AND BACK →
FIG. 4   FIG. 5

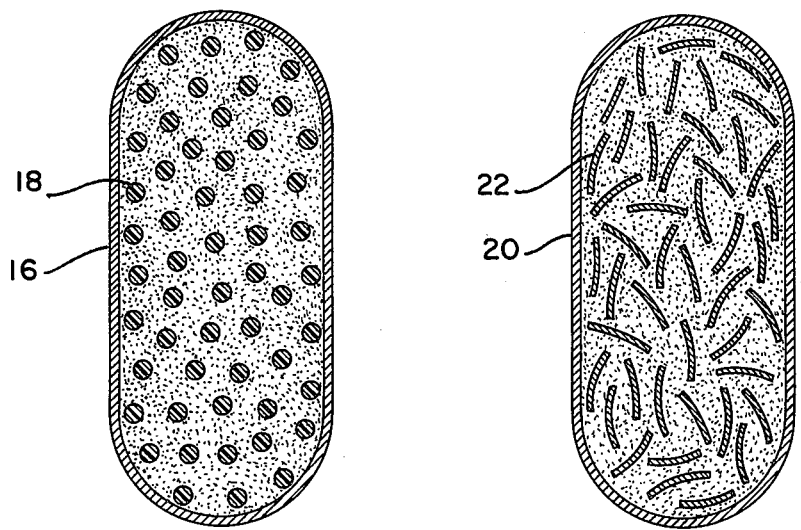
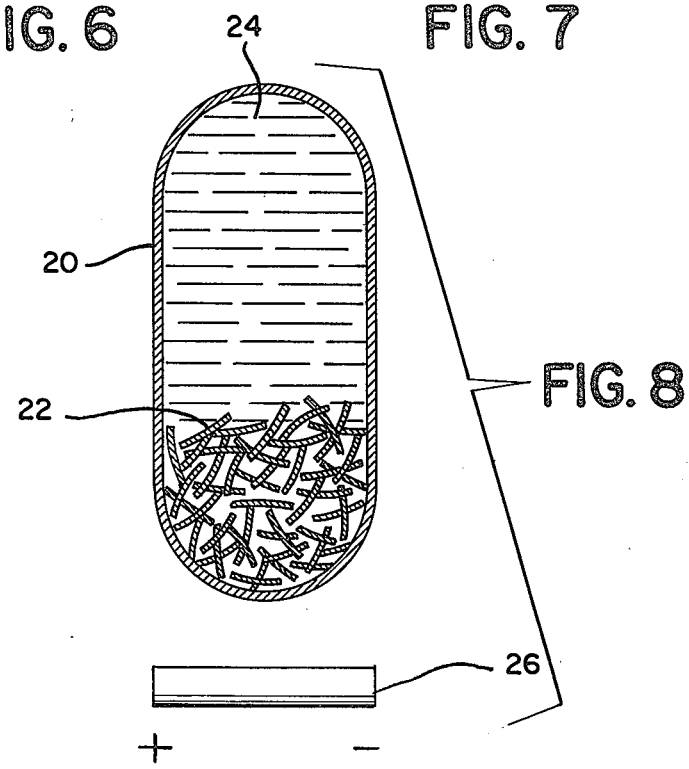

DEVICE FOR RECORDING TEMPERATURE MINIMUMS

The present invention relates to a device for determining a drop in a temperature below a predetermined temperature minimum or threshold. More particularly, the invention relates to a device which is a small container containing a gel which forms a continuous phase and which contains another phase, preferably a dispersed phase. When the device is exposed to below a certain temperature, the gel liquidifies and the dispersed phase changes position relative to the liquidified gel and forms a continuous or segregated phase and which is separated from the continuous phase. In this manner the drop in temperature is recorded. A permanent record that the temperature has dropped below the transition temperature of the gel to liquid is made since when the temperature returns above the liquefaction temperature threshold, the two phases remain separated. In a preferred embodiment the device of the invention is a small closed glass vial containing the gel having dispersed therein the other phase, which has a density different from that of the gel. The gel is an aqueous system containing a non-ionic polyol polymer and the other phase is air or another selected material (solid, liquid or gas).

Various temperature recording and indicating devices are of course known. Generally these devices indicate temperature highs, that is the increase of temperature above certain levels. These devices usually show a color change resulting from melting of a material or of a series of graded materials. There is however a need for devices, especially simple and low cost devices for recording temperatures in the opposite direction, that is, a drop of temperature below certain threshold temperatures. The device of the invention fulfills this need.

The device is highly useful in various applications where information is needed about a temperature drop below a certain temperature range, and for recording such drop. For instance, the device is useful for recording failures in heating systems such as in buildings, plants and other structures below pre-selected minimums including in apartments, commercial buildings, greenhouses, industrial buildings, storage facilities, or in any structure which is to be kept at or above a certain temperature minimum. Some of these structures may be heated by artificial heating and/or solar systems. The drop in temperature recorded by the device of the invention can then activate supplementary or alternative heating systems.

The device of the invention is also useful in recording exposure of certain goods or merchandise including foods to certain temperature minimums, especially for materials which are sensitive to such exposure such as certain chemicals, paints like latex paints, drugs, medicines and foods.

Another application of the device of the invention is for recording the occurrence of temperature excursion below a threshold minimum in the shipping, maintenance or other handling of tropical plants, tropical fish or various animals, particularly those which are cold sensitive species. The device of the invention can be connected to such living species and as the temperature drops below the selected threshold, notification of that drop is made and corrective measures activated. Another application of the device of the invention is for food growers such as for fruit or vegetables that are sensitive to drops in temperatures. The device can be connected to trees in various parts of the field as in orange groves to assist in the spotting of danger areas from frost or cold. The device of the invention then records the drop in temperature to which the product has been exposed, and without which no such record would have been available.

The device of the invention has various uses in consumer applications where food or other material should be chilled before using, to determine that the chilling operation has been satisfactorily carried out. The device is useful in recording drops of temperatures in the transporting of perishables or material sensitive to temperature drop albeit for short period of time, such as flowers, avacados, bananas and other similar perishables. The device of the invention is useful in various manufacturing such as chemical operations where it is necessary that the reactants do not drop below a specified temperature, and to actuate corrective measures if this occurs.

The device of the invention is useful in biomedical applications where it is necessary to record a drop in body temperature (inside or outside). The device can be made in very small size, in materials such as plastic, compatible with insertion in or contact with the human or animal body. The device of the invention is useful in outer space exploration, manned or unmanned, it is useful in underwater applications. Another use of the invention is in conjunction with instrumentation of great accuracy which must not be exposed or operated at temperatures below certain specified minimums. The device of the invention provides a permanent and reliable, yet simple, record that a drop in temperature has occured, such as may be required in conjunction with proof for insurance purposes. There are numerous other applications to which the device of the invention is ideally suited.

A plurality of devices of the invention can indicate and record a plurality of drops of temperature below certain pre-selected temperature minimums.

A primary object of the present invention is to provide a device for recording a temperature drop.

Another object is to provide a device which records a temperature drop below a certain pre-selected temperature. Another object of the present invention is to provide a device which provides a permanent record that the temperature has dropped below the pre-selected temperature. A further object of the invention is to provide a device which is reuseable. An additional object of the invention is to provide a device which is small in size, and reliable. Yet another object is to provide a device which is independent of the failures and shortcomings of other temperature controlling devices, thus contributing to the reliability of the device.

Another object of the invention is to provide a device which does not have several industrial applications, thus, is of considerable versatility. Another object of the invention is to provide a device which does not rely for its operation on, but which can be used in conjunction with standard heating, cooling or other temperature controlling devices.

Another object is to provide a device which records an excursion beyond the threshold temperature minimum independently of the physical position or change of position of the device between the start and the end of the operation of the device.

An additional object of the present invention is to provide a system which includes a plurality of such devices for determining temperature drops, which is capable of recording as many different temperature drops as is necessary. These and other objects of the present invention will become apparent from the specification, the figures and the examples which follow.

The invention is better understood and illustrated by reference to FIGS. 1 through 5.

FIG. 1 shows a small (2 cm in length, 0.7 cm in width) glass vial 1, which contains a gel foam 2 which fills the entire vessel in which minuscule air bubbles 3 are dispersed.

FIG. 2 shows the same vial after it has been exposed to below the temperature of transition of the gel to liquid, wherein 4 is the liquified gel (bubble-free) in the lower portion of the vial and 5 is the space now filled with air after the gel has liquified.

FIG. 3 shows the same vial which has been warmed to a temperature above the transition temperature of the liquid to a gel where 6 is the bubble-free gel, and 7 is the air space.

FIGS. 4 & 5 illustrate a plurality of devices as illustrated in FIG. 1. In FIG. 4 each one of the vials 8 is filled with a gel having a different transition temperature from gel to liquid as shown, namely 18, 16, 14 and 12° C.

FIG. 5 illustrates the system above excursion from room temperature, 20° C, (68° F) to 15° C (59° F) wherein vials 9 and 10 show a permanent record of the temperature excursion to below 16° C with the clear gel 11 and the air space 12 and vials 13 and 14 are shown in the same physical state as in FIG. 4, showing that the temperature did not drop below 14° C.

FIG. 6 illustrates a vial of the invention with plastic particles dispersed in the gel.

FIG. 7 illustrates a vial of the invention with metal slivers dispersed in the gel, which in FIG. 8 are illustrated in a collected position towards the bottom of the vial.

In a preferred and simple embodiment of the invention there is provided a small (2 × 1 cm) closed glass vial which is filled with a reversible thermo-gel, a block copolymer of ethylene oxide and propylene oxide in an aqueous solution, such as 23 percent solution of the polymer in water, with air bubbles dispersed in it. The gel appears as a hazy foam because of the minuscule air bubbles trapped in it. The gel of the device is stable indefinitely. It is independent of its physical position, i.e, it can be turned upside down and sideways. When the device is exposed to the transition temperature of the gel from gel to liquid (e.g. 15° C) the device of the invention shows the liquified gel at the bottom of the vial and the upper portion of the vial filled with air. The excursion of temperature from the temperature above the transition temperature to below the transition temperature of liquefaction is thus recorded. When the device is reexposed to a temperature above the temperature of gelification, the gel is reformed as a clear gel, the air remaining in the space above the gel, or below the gel if the device has been turned upside down. Thus a permanent record that the temperature has dropped below the liquefaction temperature is available. If the temperature should drop once more below the liquefaction temperature, the air and the gel will remain as distinct separate phases. The device is therefore independent of the number of excursions into the lower temperature range. It is not necessary for the operation of the device that there be dispersed in the gel a multiplicity of air bubbles; one air bubble in the gel is adequate, as described hereinafter. Likewise other materials, solids, liquids or gases of a density different from the gel can be used in accordance with the invention as described hereinafter.

In accordance with the invention, the device holds the polymer-containing material which forms the continuous phase and another phase which is distinct from the first phase.

In accordance with the invention in a broader aspect, the device includes an aqueous gel which is reversibly convertible by cooling to a liquid (that is, under certain temperature conditions reverting to a gel), the gel forming a continuous phase, and another phase positioned in the gel. The other phase has a density different from that of the liquified gel. The other phase is positioned, preferably dispersed, in the gel. The second phase after temperature excursion below the liquefaction temperature of the gel shows a change in position relative the gel. It moves from its position within the gel to a position not within the gel.

The gel which is used in the device of the invention is known in the art. It is a temperature sensitive and reversible aqueous system of a polyol block copolymer of polyoxyethylene and polyoxypropylene (poly EO-PO). The polymer is water soluble and has a hydrophobic and a hydrophilic portion. The gels used in the device of the invention are solid or semisolid colloidal polymers capable of containing considerable quantities of water. The particles are linked in a coherent meshwork which immobilizes the water. The gels are "ringing" gels. They may be described as gels having a firm jelly-like consistency which when tapped lightly vibrates and returns to its original configuration. To prepare the gels, as is known, the desired block copolymer may be dissolved in water cooled to a suitable temperature as between 35° F and 50° F and then the solution may be allowed to warm to room temperature whereby a clear gel is formed.

The other material which forms the other phase is added to the cooled polymer solution before the gel is formed, or it can be positioned in the gel by mechanical agitation.

Typical of the poly EO-PO polymers useful in the device of the invention are those commercially known as PLURONICS, BASF Wyandotte Corporation, Michigan described in the literature, for instance in U.S. Pat. Nos. 2,674,619 and 3,022,335, and "Pluronic Polyols", pps. 309–314, also TETRONICS described for instance in U.S. Pat. No. 2,972,528 and Technical Data Sheet O-85R, all of which are incorporated herein by reference.

The selection of the particular thermo-gel, block poly EO-PO can be readily made by one skilled in the art keeping in mind the use intended for the device. The principal consideration is the liquifaction temperature which it is desired to record. That temperature is a function of concentration for a given block copolymer, as is known in the art. Another consideration is the gelification temperature, the temperature at which the polymer will change from the liquid to the gel state. These transition temperatures from one state to the other are not necessarily the same. The polymer in the aqueous system for use in the device of the invention may have liquefaction and gelification temperatures which are different from each other. Once the desired threshhold temperatures have been ascertained, one skilled in the art will readily be able to select the suitable polymer from the many available.

It is known that certain molecular weight ranges are more apt to form a gel in lower concentrations than others. Thus it is preferred to use for the device of the invention, those polymers which have an average molecular weight ranging from about 10,000 to about 35,000 preferably 10,000 to 28,000. The hydrophobic and hydrophilic portion in the most suitable polymers for use in the device of the invention range from about 40 to 10 percent of the hydrophobic portion and from at least 60 to about 90 percent by weight of the hydrophilic portion.

The concentration of the gel in the water may range widely. Preferably it is from about 20 to 90 percent by weight concentration, at room temperature.

Additional information regarding Pluronic polyols is disclosed for instance in *J. BIOMED. MATR. RES.* Vol 6, 1972, pages 571–582, John Wiley & Sons, Inc.

A suitable procedure for determining the liquefaction gel transition temperatures for a gel useful in the device of the invention can be performed as follows. A copolymer of PO and EO (20 percent by weight) is dissolved in water. Small, chilled glass vials (2 × 0.8 cm) are half filled with the liquid polymer. The vials are closed tightly, placed in an upright position and warmed fairly rapidly to produce a gel. Using Pluronic F68 (at a concentration of 50–60 percent), the gel is formed at 20° C.

The vials containing the gel are inverted in a holder immersed in an agitated, temperature-controllable water bath fitted with means for viewing the vials. The temperature of the bath is lowered sufficiently slowly (e.g., 0.3° C/minute) so that the contents of the vials will have at any time essentially the same temperature throughout. The liquefaction gel-transition temperature is defined as the temperature of the bath at which the movement of the contents in the vials occurs. When the gel turns into a liquid, it runs to the lower portion of the vial.

The apparatus may be so arranges that several vials containing different aqueous polymer systems or different concentrations of the same polymer may be observed concurrently. Thus the liquefaction gel transition temperature of each one of the polymer systems is determined.

The solidification liquified gel-transition temperature may be determined by using water bath which is gradually warmed. In this case, the vials containing the liquified polymer are turned end to end while slow warming takes place until gelling occurs, which is then recorded. Values for gelling are also known in the literature.

In accordance with these procedures, the liquefaction and gelification temperature for each particular gel can be determined or conversely a gel can be prepared which has the desired gel-transition or liquid-transition threshhold temperatures.

In accordance with the invention the reversible gel forms the continuum or continuous phase in the container, such as the vial. In accordance with the invention, this continuous phase has another phase positioned in the gel. This phase as disclosed above in one of its simplest embodiments, may be an air bubble or a multiplicity of air bubbles. The phase other than the gel phase, is in accordance with the invention, either a phase dispersed in the gel, or a phase which need not be dispersed as for instance the embodiment of a single air bubble or a metal foil positioned in the gel.

What is required in accordance with the invention is that the phase which is positioned within the gel be capable of changing its position from that within the gel to a position where it is not within the gel, as the gel has liquified. This change of position of the phase detects and records the excursion of the temperature below the threshhold temperature. Thus in accordance with the invention, the phase which is positioned within the gel has a density different from that of the gel which is about 1.0; it can be higher or it can be lower.

A typical material of a density less than that of the gel is a gas such as air. Any solid material which has a lesser density than the gel can also be used in accordance with the invention. A favored group is represented by synthetic materials such as polyolefins plastics.

For instance, the dispersed phase in the gel may be of plastic particles which can be, for instance, small chips, beads which may be hollow of various shape such as spheroidal and others. There may be used for instance a single piece of plastic or other material which will first be embedded in the gel and upon liquefaction will rise to the surface of the gel, if lighter, or drop below, if heavier. The embodiment where the second phase is dispersed in the gel is preferred since there is a more apparent difference between the gel in its liquid versus the dispersed phase than otherwise. The physical shape of its particles is selected to promote ease of movement within the vial. These and other considerations are within the skill of the worker in the art.

In FIG. 6 in vial 16, plastic particles as small spheres 18 are shown dispersed in the gel.

It can be seen too that several materials of different densities may be used in conjunction with the gel so that the different densities will be an indication of the length of time which has passed since the excursion of the temperature below the threshhold temperature. The materials in the gel may have different densities all of which can be less dense than that of the gel or some or all may have a density which is greater than that of the gel.

When the phase which is distinct from the gel is lighter in density than the gel, it can also be a liquid preferably non-miscible with the liquified gel. Numerous liquids are suitable for that purpose such as various mineral oils, hydrocarbons, parafins and others. Preferably these should be inert with respect to the gel.

When the phase other than the gel is denser than the gel, it can be a solid or a liquid. When it is a solid, it can be any metal such as copper, nickel, iron, aluminum, chromium and their respective alloys.

In a preferred embodiment of this aspect of the invention, the solid can be a ferromagnetic metal. The metal can move through the now liquified gel in any direction, after excursion below the threshhold temperature, by means of a magnet which may be placed externally; the collected metal in turn acts as an electrical switch for an audio or other device, such as a bell that will give an alert notifying that the minimum threshhold temperature has been crossed.

In FIG. 7 in vial 20, metal slivers 22 are shown dispersed in the gel, and in FIG. 8, the ferro-magnetic slivers 22 are shown attracted by magnet 26 collected at the bottom of vial 20 after the gel has become liquid 24 due to the drop in temperature below the threshold.

Similar other methods can be used to achieve substantially the same alerting or notification system as the phase distinct from the gel changes its position relative the gel.

Another group of suitable materials which have a density greater than the gel are certain non-miscible liquids such as certain halo-substituted hydrocarbons, like tetrachloroethylene. Other suitable non-miscible materials having a density greater than that of the gel can also be used.

It is highly desirable that the gel and the other phase in the container be inert, especially chemically inert with respect to each other. If they are reactive, they should not be so to the extent of interfering with the object of the invention so that enough of the non-gel phase remains in the container to accomplish what is desired.

It is preferred also that the gel is substantially ionfree, and, even under certain circumstances sterile, so as not to promote the growth of micro-organisms. However, certain materials can be included in the gel such as wetting agents or others so long as they do not affect the gel's operation in accordance with the invention. Acids, alcohols, of anionic or cationic surfactants tend to lower the gel strength or change the temperatures at which liquefaction occurs. On the other hand, it is known that certain water soluble organic chemicals will increase the gel strength. Thus, any additive which does not detract from the operation of the gel and its coaction with the other phase in the container can be used. Indeed, such additives might be well suited for bringing the gelification or liquefaction temperature to the desired threshhold temperatures. The relative proportion of one phase to the other is not critical and may vary widely such as from 20% to 99.9% percent by volume of the gel and from 0.1% to 80% for the other phase.

For practical applications, it is generally adequate that the transition or threshold temperature of liquefaction be not lower than about 5° C and not higher than about 80° C, for numerous applications in the range of 15°–35° C.

Various practical additional means can be used to improve the detection and recording of the excursion beyond the threshhold temperature in the device of the invention. For instance, the water of the aqueous gel may be colored thus imparting a color to the continuous phase. Likewise the phase other than the gel can be colored. The device of the invention can have a background to which the devices are fixed, also to facilitate the detection of the physical change of the device. The device of the invention may have a container of plastic like a bubble or a vial heat-sealed on a suitable substrate such as plastic or cardboard. Ideally the container has a low vapor transmission, like glass. For convenience the container is transparent.

The following examples are represented to illustrate but not to limit the invention.

EXAMPLE 1

A small vial (or 2cm in length and 5–10mm of inside diameter) is half-filled with a solution of Pluronic F-127 dissolved in cold water (10° C) to a concentration of about 25% at 15° C. The vial is closed tightly. The vial is about half-filled with the liquid polymer. The vial is then allowed to warm to room temperature (23° C) while being energetically shaken and it is observed that the liquid turns into a gel (at 18° C) giving the milky appearance, the air bubbles being dispersed throughout the gel filling the vial. The gel is indefinitely stable.

When the temperature drops below 18° C, the gel turns liquid and the upper portion of the vial is filled with the air. Pluronic (F-127) a commercially available block polymer of propylene and ethylene oxide, molecular weight 12,500, specific gravity 1.05, at 77° C; in water, at a concentration of 20% and over, exists in a gel state at 25° C. As the concentration of Pluronic F-127 increases as the minor component in the aqueous system, the gel-sol transition temperature decreases.

Examples 2–14, shown below, illustrate other materials used in the vials.

TABLE I

EXAMPLES 2–14
DEVICES WITH VARIOUS MATERIALS

| | Gel | Other Material |
|---|---|---|
| 2 | Aqueous solution of Pluronic F-127 | Tetrachlorethylene |
| 3 | | Polyethylene micro beads low density (50 mesh) |
| 4 | | Copper powder magnetic (80 mesh) |
| 5 | | Iron oxide special magnetic (100 mesh) |
| 6 | | Ferric oxide (120 mesh) |
| 7 | | Silica powder (50 mesh) |
| 8 | | Glass beads (100 mesh) |
| 9 | | Tetrachloroethylene |
| 10 | | Mineral oil |
| 11 | | Polythylene micro beads + copper powder |
| 12 | | Air bubbles + copper powder |
| 13 | | Polyethylene powder + copper powder |
| 14 | | Iron oxide (silver) |

Instead of the polymer used above, the glass vials were about three-quarters filled with aqueous solutions of other block copolymers of propylene and ethylene oxide (in aqueous solution). The materials as listed above were added to each vial (in an amount ranging from 3–8% by volume) and then the temperature of the vial is raised with agitation to the gelling temperature, following the same procedure.

The following is a list of suitable polymers and their respective gelling concentrations, which are suitable for use in accordance with the invention.

TABLE II

| | | Hydrophobic mol wt | Hydrophilic % in molecule | Gels at 20° C Concentration % |
|---|---|---|---|---|
| Pluronic | F-127 | 4000 | 80 | 20–90 |
| | P-123 | 4000 | 30 | 30–90 |
| | P-103 | 3250 | 30 | 30–90 |
| | P-104 | 3250 | 40 | 30–90 |
| | P-105 | 3250 | 50 | 30–90 |
| | F-108 | 3250 | 80 | 30–90 |
| | P-94 | 2750 | 40 | 40–90 |
| | P-84 | 2250 | 40 | 40–90 |
| | P-85 | 2250 | 50 | 40–90 |
| | F-87 | 2250 | 70 | 40–90 |
| | F-88 | 2250 | 80 | 40–90 |
| | F-98 | 2750 | 80 | 40–90 |
| Tetronic | 1508 | 6501–7000 | 80 | 20–90 |

When each one of the devices of the examples is placed within a controlled environment and the temperature is made to drop below the transition temperature of the gel, the gel liquifies and the other material does not return to its former state of suspension within the gel, thus providing a permanent record that the excursion below the threshold temperature had taken place.

Other variations within the average skill of one skilled in the art will become apparent upon the teaching of this invention and are considered within the scope thereof.

I claim:

1. In a device for determining a drop below a temperature threshold point which includes a container holding a polymer-containing aqueous gel in a continuous phase, the improvement which comprises a dispersed phase in the continuous gel, which gel liquifies from gel to liquid below a first temperature point and is reversible from liquid to gel above a temperature point, the device being thereby capable of detecting a decrease of the temperature below the first temperature point by liquifying and by a change of position of the dispersed phase relative to the gel in the continuous phase.

2. The device of claim 1 wherein the dispersed phase has a density different from that of the gel.

3. The device of claim 2 wherein the dispersed phase is less dense than the gel.

4. The device of claim 3 wherein plastic particles form the dispersed phase.

5. The device of claim 4 wherein the particles are hollow.

6. The device of claim 5 wherein the plastic particles are spheroidal in shape.

7. The device of claim 3 wherein the dispersed phase is a liquid, non-miscible with the liquified gel.

8. The device of claim 7 wherein the liquid is a mineral oil or a hydrocarbon.

9. The device of claim 8 wherein the dispersed phase is a solid.

10. The device of claim 7 wherein the liquid is colored, thereby imparting improved visibility to the system.

11. The device of claim 2 wherein the dispersed phase is denser than the gel.

12. The device of claim 11 wherein the solid is a metal or a metal oxide.

13. The device of claim 12 wherein the metal is one of the following: copper, nickel, iron, aluminum, chromium, or their alloys.

14. The device of claim 12 wherein the metal oxide is iron oxide.

15. The device of claim 12 wherein the solid is ferromagnetic.

16. The device of claim 15 which includes a magnet positioned outside the container, which attracts the ferromagnetic material, thereby facilitating detection of the excursion beyond the threshold temperature.

17. The device of claim 11 wherein the dispersed phase is a liquid, non-miscible with the liquified gel.

18. The device of claim 17 wherein the liquid is colored, thereby imparting improved visibility of the system.

19. The device of claim 17, wherein the liquid is a halo-substituted hydrocarbon.

20. The device of claim 19 wherein the liquid is tetrachloroethylene.

21. The device of claim 2 wherein the dispersed phase comprises two materials of different densities.

22. The device of claim 21 wherein in the dispersed phase of the two materials of different densities, one is of higher and one is of lesser density than the gel.

23. The device of claim 1 wherein the gel has a transition temperature not lower than about 5° C and not higher than about 80° C.

24. The device of claim 23 wherein the liquifying temperature of the gel is a temperature point in the range of 15° to 35° C.

25. The device of claim 23 wherein the transition temperature of the gel is about room temperature, the gel becoming liquid below room temperature.

26. The device of claim 1 wherein the water in the aqueous phase of the gel is substantially ion free.

27. The device of claim 1 wherein the aqueous phase of the gel is sterile.

28. The device of claim 1 wherein the water of the aqueous gel is colored, thereby imparting a color to the continuous phase.

29. The device of claim 1 wherein the container is transparent.

30. The device of claim 29 wherein the container is glass.

31. The device of claim 30 wherein the container is sealed.

32. The device of claim 1 which comprises a background means to which the device is affixed, thereby facilitating detection of the changes in the device.

33. The device of claim 1 wherein the polymer is a polyol block copolymer.

34. The device of claim 33 wherein the polymer is a block copolymer of polyoxyethylene and polyoxypropylene.

35. The device of claim 34 wherein the polymer has a hydrophobic and a hydrophilic portion, the hydrophobic portion being from about forty to ten percent by weight and the hydrophilic portion being from about sixty to about ninety percent by weight.

36. The device of claim 35 wherein the polymer has an average molecular weight ranging from about 10,000 to 28,000.

37. A system for determining a series of temperature thresholds which comprises a plurality of devices defined in claim 1, the gel in each of the several devices having a different liquifying temperature from gel to liquid so that each gel liquifies when the temperature drops below the respective threshold.

38. The device of claim 1 wherein the transition temperature from gel to liquid is not lower than about 5° C, the device thus being operative in detecting a temperature drop from a temperature upwardly from about 5° C.

39. In a device for determining a temperature threshold including a container.

the improvement which comprises, positioned in the container, a polymer containing an aqueous gel in a continuous phase, and a phase of a different density than the gel positioned within the gel, the gel being an aqueous polymer system which liquifies from gel to liquid below a first temperature point and gels from liquid to gel above a temperature point, the phase positioned in the gel being capable of changing position from its position suspended in the gel to a position where it is not suspended within the gel as the gel has liquified, the device thereby being capable of detecting a decrease of the temperature below the first temperature point by liquifying and by a change of position of the phase relative to the gel.

40. The device of claim 39 wherein the phase is a single gas bubble.

41. The device of claim 39 wherein the phase positioned in the gel is a solid piece of material which has a density greater than that of the gel.

42. The system of claim 41 wherein the solid is ferromagnetic.

43. The method of determining a temperature threshold in a device which includes a container holding a polymer in an aqueous gel in a continuous phase and a dispersed phase in the gel, wherein the gel is liquifiable below a first temperature point and is reversible from liquid to gel above a temperature point, which comprises subjecting the device to a temperature below the liquefaction gel-transition temperature, causing the gel to liquify and causing the dispersed phase to change its position relative the gel, thereby registering a decrease of the temperature below the liquefaction gel-transition temperature.

44. The method of claim 43 wherein an excursion of the temperature below the transition temperature causes the dispersed phase to rise above or fall below the liquified gel.

45. The method of claim 43 which includes subjecting the device to a temperature in the range above the transition temperature in which the liquid becomes a gel.

46. The method of claim 45 which comprises activating an indicia of the lowering of the temperature when the temperature drops below the transition temperature of gel to liquid.

47. The method of claim 46 wherein the indicia is visual.

48. The method of claim 46 wherein the indicia is audible.

49. The method of claim 46 wherein the indicia is electrically activated.

50. The process of claim 43 which comprises subjecting the device to agitation to create the non-continuous phase in the continuous gel prior to subjecting the device to the liquefaction temperature.

51. The method of claim 43 wherein the phase in the gel is a gas.

52. The method of claim 51 wherein the gas is air.

53. In a device for determining a drop below a temperature threshold point which includes a container holding a polymer-containing aqueous gel in a continuous phase, the improvement which comprises a dispersed gas phase in the continuous gel, which gel liquifies from gel to liquid below a first temperature point and is reversible from liquid to gel above a temperature point, the device being thereby capable of detecting a decrease of the temperature below the first temperature point by liquifying and by change of position of the dispersed gas phase relative to the gel in the continuous phase.

54. The device of claim 53 wherein the gas phase is air.

55. The device of claim 54 wherein the gas is air bubbles.

56. The device of claim 55 wherein the air bubbles are small.

57. The device of claim 53 wherein the transition temperature from gel to liquid is not lower than about 5° C, the device thus being operative in detecting a temperature drop from a temperature upwardly from about 5° C.

58. A system for determining a series of temperature thresholds which comprises a plurality of devices defined in claim 53, the gel in each of several devices having a different liquifying temperature from gel to liquid, so that each gel liquifies when the temperature drops below the respective threshold.

* * * * *